(12) United States Patent
Cohen

(10) Patent No.: US 8,518,359 B2
(45) Date of Patent: Aug. 27, 2013

(54) PHOSPHORUS RECOVERY

(75) Inventor: Yariv Cohen, Uppsala (SE)

(73) Assignee: EasyMining Sweden AB, Uppsala (SE)

(*) Notice: Subject to any disclaimer, the term of this patent is extended or adjusted under 35 U.S.C. 154(b) by 979 days.

(21) Appl. No.: 12/531,961

(22) PCT Filed: Jan. 4, 2008

(86) PCT No.: PCT/SE2008/050010
§ 371 (c)(1),
(2), (4) Date: Sep. 18, 2009

(87) PCT Pub. No.: WO2008/115121
PCT Pub. Date: Sep. 25, 2008

(65) Prior Publication Data
US 2010/0068113 A1    Mar. 18, 2010

(30) Foreign Application Priority Data
Mar. 19, 2007 (SE) .................................... 0700698

(51) Int. Cl.
*C02F 1/42* (2006.01)
*C01B 25/28* (2006.01)
*B01J 14/00* (2006.01)

(52) U.S. Cl.
USPC ........... 423/312; 210/683; 210/906; 422/129; 422/212

(58) Field of Classification Search
USPC .............. 423/322, 328, 312; 422/245.1, 212, 422/129; 210/683, 906
See application file for complete search history.

(56) References Cited

U.S. PATENT DOCUMENTS

| | | | |
|---|---|---|---|
| 1,835,441 A | 12/1931 | Suchy et al. | |
| 1,879,204 A | 9/1932 | Guillissen | |
| 2,850,358 A | 9/1958 | Reeve et al. | |
| 3,512,942 A * | 5/1970 | Dunseth et al. | ............... 422/606 |
| 3,579,322 A | 5/1971 | Higgins | |
| 6,280,494 B1 | 8/2001 | Jardine | |

FOREIGN PATENT DOCUMENTS

| | | |
|---|---|---|
| DE | 1 442 500 | 7/1969 |
| EP | 0 399 803 | 5/1989 |
| FR | 2 651 222 | 3/1991 |
| GB | 322700 | 12/1929 |
| GB | 410 731 | 8/1932 |
| GB | 1 101 863 | 2/1965 |
| GB | 2 060 430 | 5/1981 |
| GB | 2060429 A | 5/1981 |
| RU | 1 450 266 | 5/1996 |

(Continued)

OTHER PUBLICATIONS

International Search Report dated Jun. 30, 2008, from corresponding PCT application.
Yagodin—Osnovy Zhiskostnoy Ekstraktsii, p. 236-237, English abstract provided, cited in the Russian Office Action.
Office Action dated Nov. 28, 2011, from corresponding Russian application No. 2009136243/05.

(Continued)

*Primary Examiner* — Wayne Langel
*Assistant Examiner* — Syed Iqbal
(74) *Attorney, Agent, or Firm* — Young & Thompson

(57) ABSTRACT

Phosphorous ions are extracted (210) from solutions by adsorbing phosphorous ions in a scavenger and by releasing the phosphorous ions into an eluate during regeneration (230) of the scavenger. The regeneration (230) is performed by ammonia. Phosphate anions are precipitated (262) in form of tri-ammonium phosphate upon introduction (260) of excess amounts of ammonia. The ammonia remaining in solution after the precipitation of tri-ammonium phosphate is reused (266) for regenerating the scavenger.

20 Claims, 7 Drawing Sheets

(56) References Cited

FOREIGN PATENT DOCUMENTS

| | | |
|---|---|---|
| SU | 424849 | 4/1974 |
| SU | 674979 | 7/1979 |
| SU | 823286 | 4/1981 |
| WO | 00/50343 | 8/2000 |

OTHER PUBLICATIONS

Franz, M., "Phosphate fertilizer from sewage sludge ash (SSA)", Waste Management, 2008, vol. 28, pp. 1809-1818, XP 23437551.
Extended European Search Report, dated May 6, 2013, from corresponding EP application.

* cited by examiner

PHOSPHORUS RECOVERY

TECHNICAL FIELD

The present invention relates in general to recovery of ions and in particular to phosphorus recovery by use of ion exchange and precipitation techniques.

BACKGROUND

Phosphorus is an important element, and indeed essential to life. However, the release of phosphate to surface waters, and its consequent contribution to eutrophication, has also led to increasing water quality concerns. Policies were therefore implemented throughout the world, to reduce the levels of phosphorus entering surface waters, by the implementation of technologies to remove phosphorus from domestic and industrial wastewater.

Phosphorus resources are limited and will last about 100 years, if mined by methods currently regarded as economic. This knowledge initiated an interest in technologies which facilitate the recycling and beneficial re-use of the phosphorus present e.g. in waste products in agriculture.

Fertilization with sewage sludge is gradually being prohibited in an increasing number of countries due to the sludge's content of heavy metals and organic contaminants. Incineration is seen as a solution to reduce the volume of disposed sewage sludge.

Ash of incinerated sewage sludge contains about 8-14% P by weight, which is similar to the concentration of P in phosphate rock (e.g. 13% P by weight). The ash commonly contains more than 90% of the P present in sewage. Ash of incinerated MBM (Meat and Bone Meals) contains up to 18% P. Ash of incinerated poultry litter contains about 10% P and phosphorus content in ash of gasified pig manure was reported to be 13% P. The phosphorus present in ash is insoluble in water due to binding with calcium, iron or aluminum. Therefore is the P-fertilizer value of ash low. Furthermore, heavy metals are enriched in ash and limit the recirculation of ash to cropped land. Today, ashes are deposited as a rule.

Phosphorus can be extracted from ashes into an aqueous phase by dissolution with acids or bases.

In summary, several phosphorus containing effluents are formed in various industrial processes, and by the dissolution of ashes and minerals. The effluents are usually dilute and polluted with metals.

There is a need for phosphorus recovery from such effluents. The objective of phosphorus recovery is that it should be used for farming.

Several technologies were developed for extracting phosphorus from domestic and industrial effluents, and from ash leach solutions. The technologies are mainly based on the precipitation of phosphorus as different compounds. However, most such precipitation compounds have a very low solubility and its fertilizer value is low.

However, in e.g. the U.S. Pat. No. 2,850,358, the U.S. Pat. No. 1,879,204, the U.S. Pat. No. 1,835,441, the British patent 410,731 or the translation of the abstract to the Soviet patent 1450266, it is known that tri-ammonium phosphate is more or less insoluble in concentrated aqueous ammonia. An excess of ammonia can then be used to precipitate phosphorus as tri-ammonium phosphate, which can be easily processed to a high quality fertilizer.

However, in order to precipitate phosphorus efficiently with an excess of ammonia, the initial phosphorus concentration must typically be high. Furthermore, a large excess of ammonia is needed. The remaining solution after the precipitation of tri-ammonium phosphate therefore contains large amounts of ammonia which must be treated by e.g. ammonia stripping. Therefore, it is not possible to recover phosphorus from dilute phosphate containing solutions by precipitation of tri-ammonium phosphate in a cost effective way.

In another approach, phosphorus can be separated from the metals by using anion exchange excluding metal cations. The published PCT patent application WO 00/50343 describes a process for recovering phosphorus from ash leach solution using ion exchange.

The approach presented in the disclosure WO 00/50343 has a number of severe drawbacks. The overall efficiency is limited, the process control is complex and the used regeneration solution (hydrochloric acid) gives no added value to the final phosphorus product.

The main limitation of using ion exchange technology as proposed in WO 00/50343 is that the solution recovered during regeneration still has relatively low concentration far below the solubility product. Concentrated regeneration solutions occupy only a small volume of the ion exchange bed and are hence diluted with the solution present in the ion exchange bed. To displace the regeneration solution out of the ion exchange bed requires another solution which thereby dilutes the eluate again. Thus, despite a high initial concentration of the regeneration solution the maximum eluate concentration achieved is often still far too low to be of commercial value.

U.S. Pat. No. 3,579,322 describes the use of Continuous Ion eXchange (CIX) for phosphate recovery from waste effluents formed during the industrial processing of rock phosphate. CIX can achieve a higher eluate concentration than possible with fixed bed ion exchange. However, CIX is a complex process, in which the movement of the resin results in resin abrasion which reduces resin life time. Furthermore, the maximum phosphorus concentration possible with this technology is limited.

SUMMARY

A general object of the present invention is to provide resource efficient methods and devices for phosphorous recovery. A further object of the present invention is to provide a method for recovering phosphorus without contamination with metals. Another object of the present invention is to provide recovered phosphorous ions in a form that easily can be utilized for fertilizing purposes.

The above objects are achieved by methods and devices according to the enclosed patent claims. In general words, phosphorous ions are extracted from solutions by adsorbing phosphorous ions in a scavenger having affinity for phosphate ions and by releasing the phosphorous ions into an eluate during regeneration of the scavenger. The regeneration is performed by ammonia. Phosphate anions are precipitated in form of tri-ammonium phosphate upon introduction of excess amounts of ammonia. The ammonia remaining in solution after the precipitation of tri-ammonium phosphate is reused for regenerating the scavenger.

The invention provides for extraction of phosphorus from process streams in form of high quality products such as NP containing fertilizers in an environmentally friendly and cost effective way. According to the invention, phosphorus can be recovered as a concentrated, water-soluble, inorganic product of a high quality, i.e. high phosphorus availability to plants/animals, minor heavy metal contamination and balanced nutrient composition. The invention is also applicable for the extraction of dissolved phosphorus from minerals and industrial effluents. Another advantage of the present invention is that it enables to reuse the ammonia remaining in solution after the precipitation of tri-ammonium phosphate without further need for treatment such as ammonia stripping.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
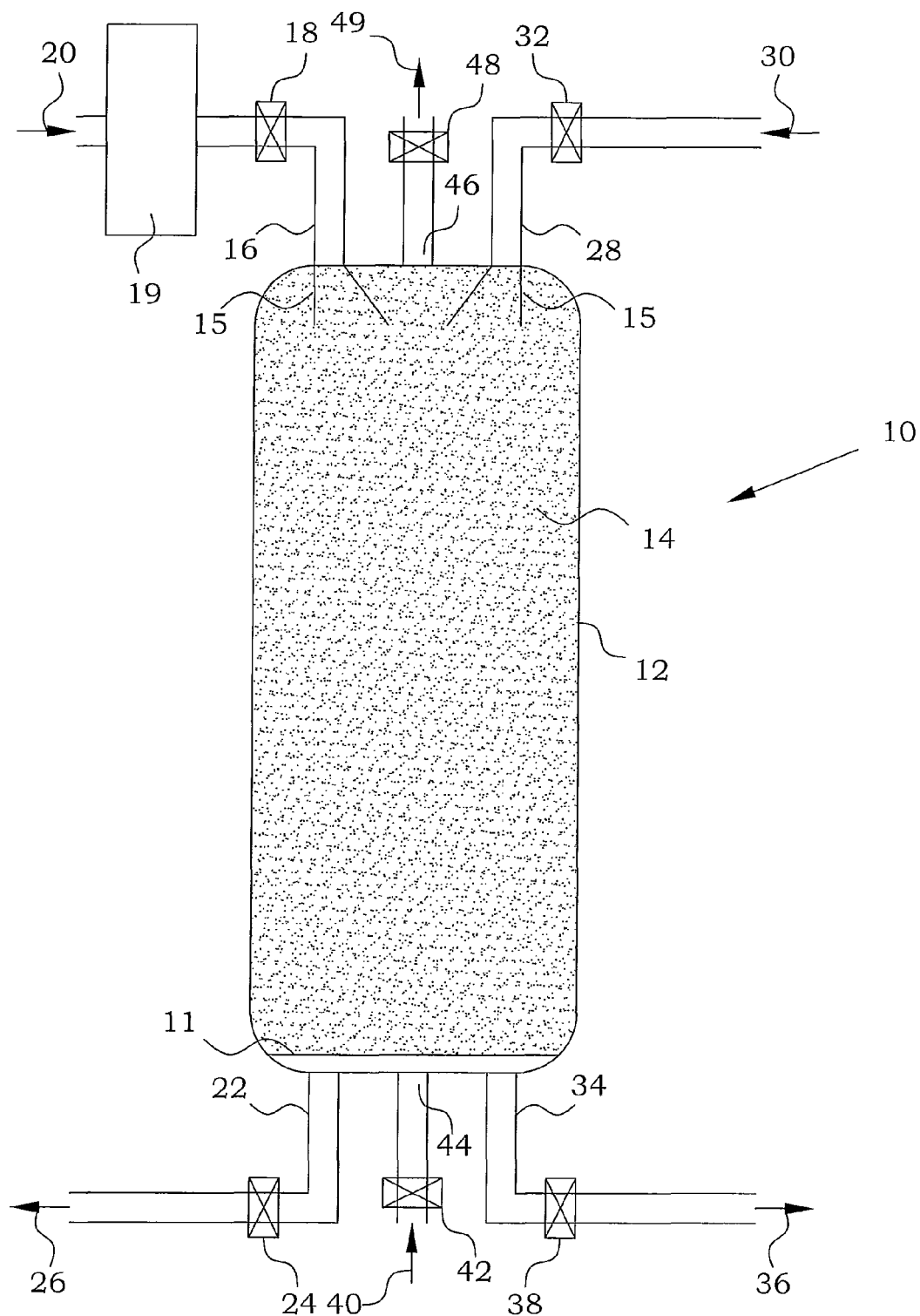
FIG. 1 is a schematic illustration of main parts of an embodiment of an ion exchange arrangement.

In order to properly understand the advantages of the present invention, the present disclosure will start with a brief introduction into some ion exchange principles.

Some often used terminology in the present disclosure is to be interpreted as follows:

Backwash—The upward flows of water or solution through an ion exchange bed to remove foreign material, reclassify the bed, and reduce compaction of the bed.

Scavenger—material having affinity for solute species, e.g. material adsorbing ions, by ion association or solvation mechanisms. The term comprises different kinds of ion exchange resins as well as extractants contained in solvents.

Ion exchange resin—ion exchange material used in an ion exchange process, traditionally in an ion exchange column.

Solvent—A liquid phase, typically organic, which preferentially dissolves extractable solute species from an aqueous solution.

Extractant—An active component, typically organic, of a solvent enabling extraction.

Diluent—A liquid, typically organic, in which an extractant and a modifier are dissolved to form a solvent.

Modifier—A substance added to a solvent to increase the solubility of the extractant, salts of the extractant, or ion species derived from extraction or stripping. Also added to suppress emulsion formation.

Solvent extraction (liquid liquid extraction)—The separation of one or more solutes from a mixture by mass transfer between immiscible phases in which at least one phase typically is an organic liquid.

Eluate—The solution resulting from an elution process during regeneration, as a result of removal of ions from an ion scavenger.

Exhaustion—When the scavenger is fully loaded with the ions, removed from the liquid being processed, the scavenger is said to be exhausted.

Partially ionized scavengers—Scavengers having weak acid or weak base functionality.

Regeneration—The displacement from the scavenger of the ions removed from the process solution to make the scavenger ready for a service cycle.

Elution—The process of removal of ions from an ion scavenger by a regeneration solution forming an eluate. Comprises "stripping" in the case of loaded solvents.

Stripping—Elution from a loaded solvent.

Regeneration solution—The solution used to displace the ions, removed from the process solution, from the scavenger.

Scrubbing—The selective removal of impurities from a loaded solvent prior to stripping.

Rinse—The passage of solution (water) through an ion exchange resin bed to flush out the regeneration solution.

Service cycle (run)—The step at which ions are removed from the feed liquid by ion exchange.

Feed solution—The liquid being processed by the ion exchange bed.

Raffinate—An aqueous phase from which a solute has been removed by extraction.

Ammonia stripping—The removal of ammonia from an aqueous solution.

Ion exchange as defined in the present invention covers both solid ion exchange as well as liquid ion exchange classified as solvent or liquid liquid extraction. The principles of solid and liquid ion exchange are briefly introduced below.

Solid ion exchange is a reversible reaction wherein an ion in a solution is exchanged with a similarly charged ion attached to an immobile solid particle. Solid ion exchange materials are either naturally occurring inorganic minerals e.g. zeolites or synthetically produced organic resins. Synthetic organic resins are predominantly used today due to superior characteristics such as high capacity and high chemical stability. Synthetic organic ion exchange resins are composed of high-molecular-weight polyelectrolytes having positive or negative functional groups that can exchange ions from the surrounding medium. A hydrocarbon polymeric network is commonly used e.g. styrene-divinylbenzene, acrylic divinylbenzene, etc.

Ion exchange resins are classified as cation exchangers, which exchange positively ions, and anion exchangers, which exchange negatively charged ions. Both anion and cation resins are produced from the same basic organic polymers. The functional group attached to these polymers determines the chemical behavior of the resin. Resins can be broadly classified as strong or weak acid cation exchangers or strong or weak base anion exchangers.

Strong acid cation and strong base anion exchangers are highly ionized. The exchangeable ion is readily available for exchange over a wide pH range i.e. the exchange capacity of strong acid and base resins is almost independent of solution pH. An example of a strong acid functional group is sulfonic acid and quaternary amine of a strong base functional group.

In contrary, the dissociation of weak acid and base resins is strongly influenced by the solution pH. A typical weak acid resin has a limited capacity below pH of 6 and weak base resins have a limited capacity above pH 8. An example of a weak acid functional group is carboxylic acid and examples of weak base functional groups are primary, secondary and tertiary amines.

A typical solid ion exchange arrangement 10 is illustrated in FIG. 1. A column 12 comprises ion exchange resin 14. Most industrial applications of ion exchange use fixed-bed column system as containers for the ion exchange resin 14 due to its simplicity and low cost. However, other containers for containing the ion exchange resin 14 are also possible. The column design must contain the ion exchange resin 14 and has typically arrangements 11 for supporting the resin bed. There are furthermore arrangements 15 for uniformly distributing the main and regeneration flow through the resin bed and provide space to fluidize the resin during backwash. The majority of ion exchange installations are based on cylindrical steel vessels but reinforced concrete, glass and plastics are also used.

In the illustrated embodiment, the ion exchange arrangement 10 comprises a feed inlet 16 for the feed solution 20. The feed inlet 16 is controlled by a valve arrangement 18. Before an ion exchange operation, the feed solution 20 is usually pretreated by filtration in a filter arrangement 19 to remove suspended solids as well as different dissolved components in order to increase resin life time. A feed outlet 22 is provided to collect the solution 26 being treated in the column 12 for transporting to storage and/or managing of the treated solution 26. The flow is controlled by a valve arrangement 24.

During regeneration, the column 12 is in many cases backwashed or drained, by feeding a washing liquid 40 through a wash inlet 44 controlled by a valve 42, and extract the washing liquid 49 through an outlet 46 controlled by a valve 48. After being washed, the actual regeneration takes place. A regeneration solution 30 is provided to the column 12 through a regeneration inlet 28 controlled by a valve arrangement 32. The ions removed from the feed solution are displaced in to the regeneration solution to form an eluate 36. The eluate 36 is collected through a regeneration outlet 34 controlled by a valve arrangement 38, for further processing and/or storing.

Figure 2:
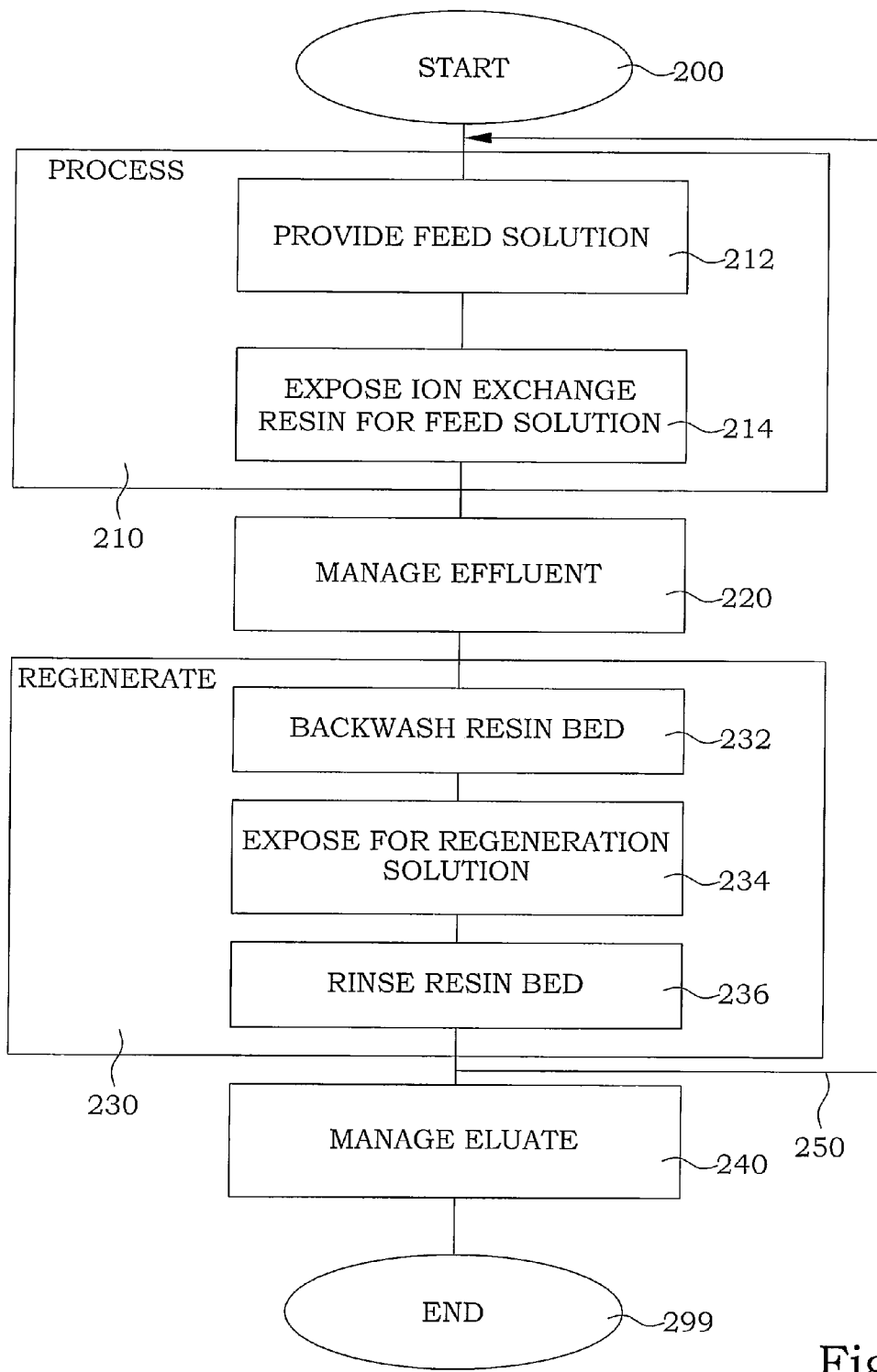
FIG. 2 is a flow diagram of main steps of an embodiment of an ion exchange process.

A typical general ion exchange procedure by use of a solid ion exchange resin is illustrated by the flow diagram of FIG. 2. The process starts in step 200. Step 210 is a processing step, where ions in a feed solution are exchanged to ions available at the ion exchange resin. Step 210 consists in the described example of two substeps. In step 212, a feed solution is provided. This step may involve any pre-treatment of the feed solution, e.g. dissolving of ions, filtration etc. In step 214, the actual exposure of the ion exchange resin for the feed solution takes place. The resulting effluent solution is managed in step 220. Example of such managing can be storage, further processing, distribution etc. of the effluent.

After the feed solution has been processed through the resin to the extent that the resin becomes exhausted and cannot accomplish any further ion exchange, the resin must be regenerated. This takes place in the regeneration step 230. In the present example, the regeneration step 230 in turn employs a number of part steps. In step 232, the column is back-washed with a solution to remove suspended solids collected by the bed during the service cycle and to eliminate channels that may have been formed during this cycle. In step 234, the resin bed is brought into contact with the regeneration solution, normally an acid for cation exchange and a base for anion exchange. In step 236, the resin bed is rinsed to remove the regeneration solution. The eluate resulting from the regeneration step 230 is managed in step 240. Such management can comprise storage, further processing, distribution etc.

The column is then returned to service again, i.e. feed solution is once more processed through the column. This is illustrated by the arrow 250. The procedure ends in step 299.

It is clear that various engineering techniques and equipment suitable for performing solid ion exchange operation can be used to perform the above described recovery process according to the principles of the invention. Some examples of possible technological schemes of solid ion exchange include but are not limited to packed (fixed) bed, fluidized bed, expended bed, co-current regeneration, counter-current regeneration, continuous operation such as moving bed, simulated moving bed by multi column technology, consecutive columns (cascade), etc.

Liquid ion exchange involves selective transfer of solute between two immiscible phases, typically an aqueous phase and an organic phase containing a liquid ion exchange material. The two immiscible phases are first thoroughly mixed in order to facilitate the transfer of solute and then separated. Similar to solid ion exchange, the functionality of liquid ion exchange materials, i.e. liquid ion scavengers, can be divided into strong and weak acid or base material. Weak base liquid extractants are usually primary, secondary or tertiary amines. These extractants have a low water solubility and good miscibility with low-cost solvents. The rate of exchange in liquid ion exchange systems is extremely high. The process is ideally suited to continuous counter current operations adaptable to a variety of engineering techniques and equipment.

Phosphate scavenger material can be of many types, both organic and non-organic. Presently, organic materials are preferably used for absorbing phosphate from solutions by ion association or solvation mechanisms. Examples are alcohols and tri-butyl-phosphate, which are non-weak base scavengers possible to use. Examples of weak base scavengers are amines, styrene-divinylbenzene with amine functionality, and acrylic divinylbenzene with amine functionality.

Concerning the use of extractants for ion exchange, usually weak base organic amines are selected having a nitrogen atom attached to a large organic molecule usually containing more than seven aliphatic or aromatic carbon atoms. The organic amines are highly soluble in organic solvents (diluents) and almost insoluble in water. In contact with an acid containing solution, the amine base reacts with the acid to form a protonated positive charge which associates with the anion of the acid.

In addition, organic amines extract more acid than the stoichiometric ratio of acid per functional group through solvation of neutral acid species. High concentration of amines in inert diluents can polymerize to form a third, non-wanted, separate phase. However, the formation can be avoided by adding a modifier, usually another strong Lewis base (e.g. octanol, iso-dodecanol, tri butyl phosphate, etc.) to the diluent.

Thus, use of amine extractants for acid extraction is more efficient than conventional solvent extraction, which is based on solvation of the acid only. The distribution coefficients involved in liquid ion exchange are higher than those encountered in conventional solvent extraction, which means that the number of stages necessary for achieving the same degree of extraction is usually less. Furthermore, the acid loading of amine extractants in inert diluents (with suitable modifier) is usually higher than that of pure other acid extractants such as tri butyl phosphate. Thus, amine extractants are suitable for extraction of phosphate from highly concentrated as well as from highly dilute phosphoric acid streams. In addition, amine extractants are selective towards anions and do not bind positively charged metals, which means that metal contaminants are separated from the extracted acid by remaining in the aqueous solution.

In order to recover phosphate ions, a liquid/liquid extraction process can be utilized, where a feed aqueous solution containing phosphate ions is exposed to an organic phase. The phosphate ions are thereby extracted into the organic phase.

It is found, as discussed also below, that weak base liquid ion exchange is of particular advantage enabling the removal of phosphate anions from dilute aqueous solution by ion association. The phosphate anions are thereafter stripped with an ammonia containing solution whereby phosphate is transferred from the organic phase to the aqueous phase through a reaction including charge neutralization.

Using the principles described above, an aqueous solution with high concentrations of ammonium phosphate can be obtained.

Figure 3:
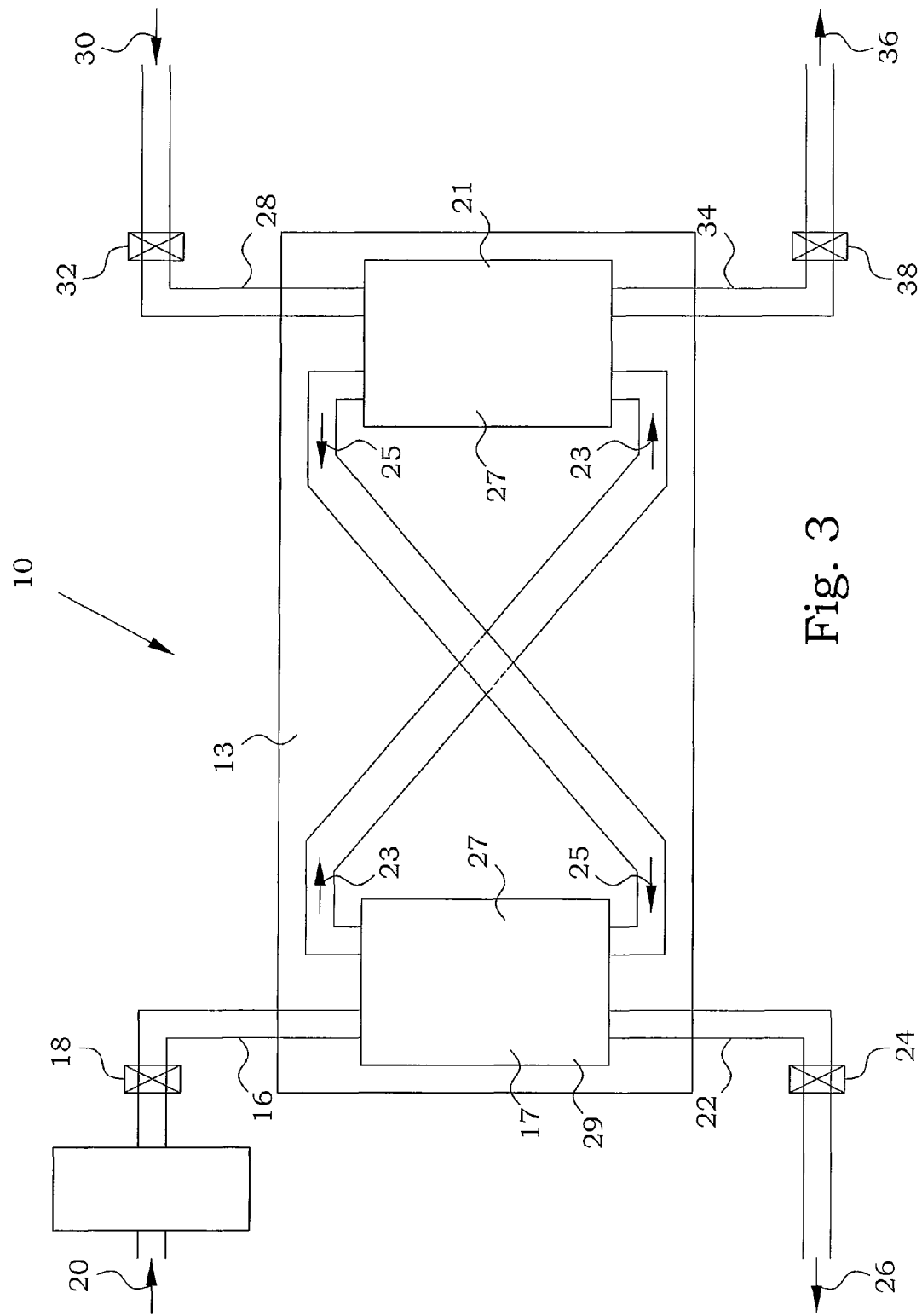
FIG. 3 is a is a schematic illustration of main parts of another embodiment of an ion exchange arrangement.

A typical liquid ion exchange arrangement 10 is illustrated in FIG. 3. Parts that are similar in functionality compared to FIG. 1 are not necessarily described again. An extraction unit 17 comprises a mixing volume 27, where feed solution 20 and a liquid ion scavenger 29 are mixed. The mutually immiscible phases are entered in different parts of the extraction unit 17. In the present embodiment regenerated scavenger 25 is entered at the bottom and the feed solution 20 is entered at the top. The phases are thoroughly mixed and ions, in this particular application phosphate ions, are bound to the scavenger 29. A feed outlet 22 is provided to collect the solution 26 being treated in the extraction unit 17 for transporting to storage and/or managing of the treated solution 26. The fully or partly exhausted scavenger 23 is extracted from the top of the extraction unit 17 for further regeneration.

Regeneration, also denoted as stripping in the case of liquid scavengers, takes place in a stripping unit 21. Also here, two immiscible phases, in this case the at least partially exhausted scavenger 23 and a regeneration solution 30, are mixed in a mixing volume 27. The ions, originally removed from the feed solution, are now displaced in to the regeneration solution to form an eluate 36. The eluate 36 is collected through a regeneration outlet 34 controlled by a valve arrangement 38, for further processing and/or storing. The regenerated scavenger 25 is extracted from the top of the stripping unit 17 for further use in the extraction procedure.

Figure 4:
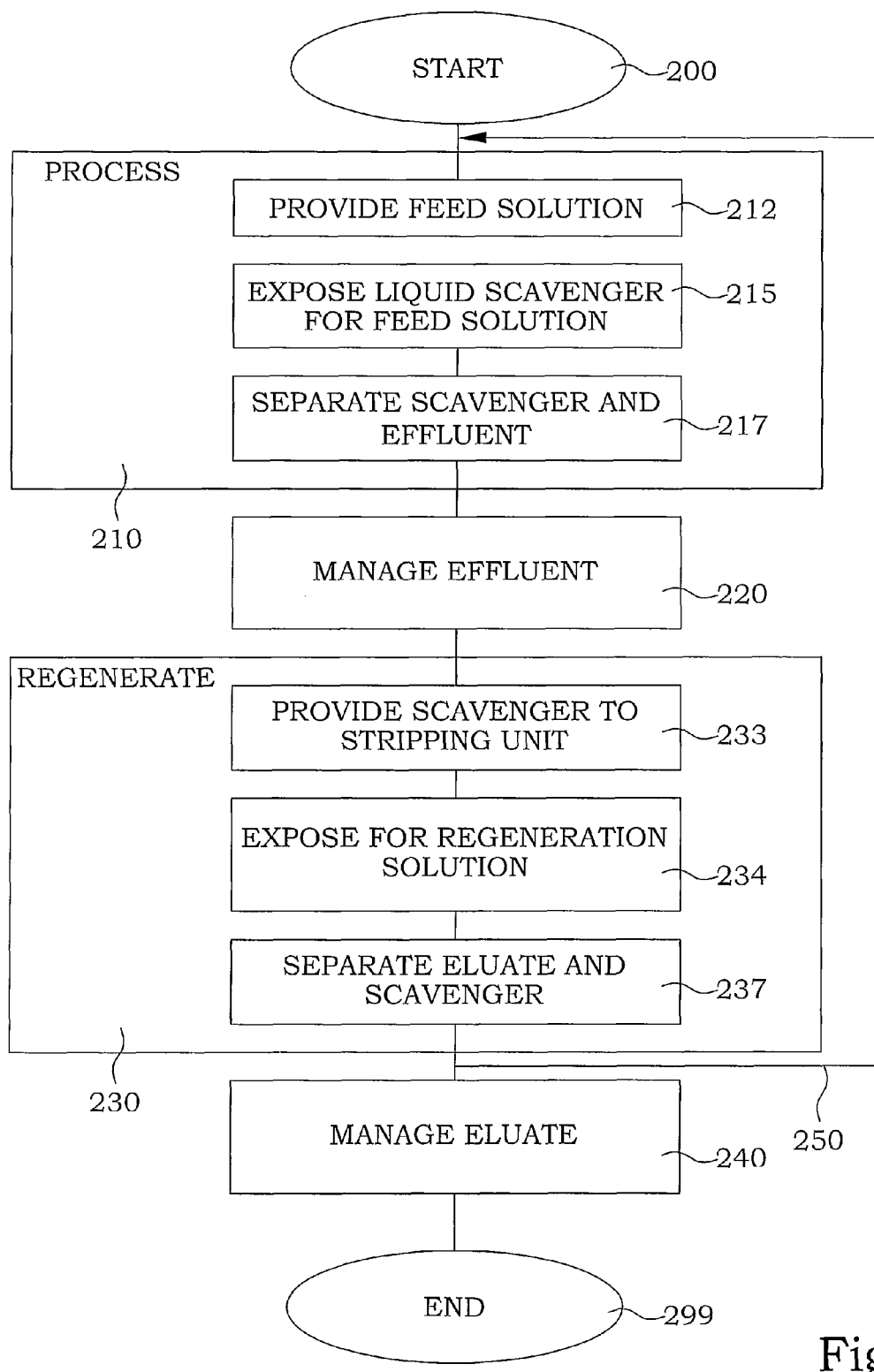
FIG. 4 is a flow diagram of main steps of another embodiment of an ion exchange process.

A typical general ion exchange procedure by use of a liquid scavenger is illustrated by the flow diagram of FIG. 4. Process steps that are in common with the process illustrated in FIG. 2 are not described again. The processing step 210 consists in this described example of three substeps. Step 212 is similar as in FIG. 2. In step 215, the actual exposure of the scavenger for the feed solution takes place, and in step 217, the scavenger and the effluent are separated.

In the regeneration step 230, in part step 233, scavenger, partly or fully exhausted, is provided to the stripping unit, and step 234 follows. After regeneration, eluate and regenerated scavenger are separated in step 237.

In order to recover phosphate ions, an ion exchange process, solid or liquid, can be utilized, where a feed solution containing phosphate ions is exposed to an ion exchange scavenger. The phosphate ions are thereby absorbed into the ion exchange scavenger. When the scavenger is exhausted, i.e. fully loaded with the phosphate ions, the ion exchange scavenger is treated by a regeneration solution. The phosphate ions are thereby eluted into an eluate and the eluate is managed.

It is found that a weak base ion exchange process presents particular advantages. A principle behind the above advantages is to remove phosphate and accompanying anions from feed solutions using a weak base anion exchange scavenger. The ion exchange scavenger is a partially ionized ion exchange scavenger, which means that the ion exchange process within the scavenger is based on a charge neutralization reaction.

$$[R]+H_3PO_4 \rightarrow [R\text{---}H^+]H_2PO_4\text{---} \quad (1)$$

Contrary to ion exchange reactions ($[R^+]A^- + B^- \leftrightarrow [R^+]B^- + A^-$), these reactions are not controlled by an equilibrium and the sorption continues essentially to completion.

The scavenger is thereafter regenerated with ammonia-comprising regeneration solution, thus forming a phosphate containing eluate. The regeneration solution has a basic pH for driving the charge neutralization reaction as following:

Also this reaction is not controlled by equilibrium and continues essentially to completion.

These measures provide an eluate which has a high potential for use in connection with ion concentration procedures. Also, the eluate can be used as a fertilizer. The eluate has already an inherent attractive plant-nutrient composition with low heavy metal content. In addition, ammonia is a cheap chemical, and it finally directly becomes a part of a fertilizer product thus increasing the value of the fertilizer product.

The present invention prefers the use of weak base scavengers where the exchanged ions in the eluate do not back-adsorb onto the scavenger. Prior art strong base resins typically reduce the regeneration capacity since the regeneration procedure is based on ion exchange equilibriums, which can not be easily adjusted by adding additives to the regeneration solution.

The regeneration of weak base scavengers is conducted by a charge neutralization reaction and not an ion exchange reaction. The capacity of the scavenger is pH depended. The pH can easily be chemically adjusted so that the scavenger can loose its charge and thus release the adsorbed ions. In that way electrostatic back-adsorption of ions onto the scavenger is very limited.

Furthermore, this also opens up for reusing an earlier recovered eluate in a further regeneration cycle in an efficient way. It is however required that the pH of the earlier recovered eluate is adjusted.

Here below, an embodiment of an ion exchange process for recovering phosphorus from ash of incinerated sewage sludge is described in details. However, the present invention is not limited to recoverage of phosphate from incinerated sewage sludge, but is applicable on many different systems providing phosphate ions. A similar process with minor modifications can be used e.g. for extracting phosphorus from minerals, P rich mine tailings, other ashes such as incinerated animal by products, P rich streams within sewage treatment works, industrial effluents, etc.

A solution is prepared by dissolving ash of incinerated sewage sludge in acid in a dissolver arrangement. The preferred acid is sulfuric acid due to its low cost and that it is supplied in concentrated form. An optimum concentration of sulfuric acid during ash dissolution was found to be about 52 g $H_2SO_4$ liter$^{-1}$. Higher concentrations result in reduced efficiency of phosphorus dissolution mainly due to dissolution of additional metal oxides and formation of gypsum around ash aggregates and lower concentration results in reduced efficiency of phosphorus dissolution. The preferred way of dissolving ash in acid is to first mix the ash with water to obtain a solid/liquid ratio of about 1:6 and then maintain a low pH (pH≦2) by continuously adding concentrated sulfuric acid in a controlled manner. The reaction time in the present embodiments for phosphate dissolution was between 30-120 min, at room temperature. The required pH level during dissolution is a function of the ash composition and is specific for each ash. A phosphate anion concentration of about 0.75 eq liter$^{-1}$ and a sulfate anion concentration of about 0.45 eq liter$^{-1}$ were obtained. Among the cations, aluminum and H$^+$ dominated, with minor contributions of Na$^{2+}$, Mg$^{2+}$, Ca$^{2+}$ and Fe$^{3+}$. The insoluble part of the ash, mainly silicates, non-dissolved metal oxides and gypsum, was removed by sedimentation, filtration or centrifugation.

In alternative embodiments, the leachate is prepared by dissolving other phosphorous comprising materials. Non-exclusive examples of such materials are, besides the above described ash of incinerated sewage sludge, e.g. ash of incinerated animal by-products, mine tailings, industrial sludge, and ores.

The phosphorus containing leachate was thereafter treated in a fixed-bed ion exchange setup, of which the anion removing part is arranged according to the present invention.

The solution obtained by the process described above was passed through an ion exchange arrangement. The solution is passed through a column comprising strong acid cation exchange resin, e.g. Dowex Marathon C from Dow or other equivalents, exchanging metal cations with protons. The effluent from the strong acid cation exchange unit consists of a mixture of phosphoric and sulfuric acid. A sulfur/phosphorus ratio of about 1 was obtained for the used sewage sludge incinerator ash (from Mora, Sweden). In general, the sulfur/phosphorus ratio should preferably be lower than five, i.e. at least 17% phosphate ions. If higher ratios are obtained the sulfate content should be reduced by precipitating sulfate with calcium at a low pH level, to prevent phosphate precipitation.

The strong cation exchange resin was regenerated with hydrochloric or sulfuric acid. The regeneration level is about 40 g $H_2SO_4$ or HCl per liter. The obtained eluate consists of mainly aluminum or iron cations associated with sulfate or chloride anions. Heavy metals are separated from the eluate by precipitation as metal sulfides. If the eluate consists of mainly aluminum sulfate or aluminum chloride, then sodium sulfide or hydrogen sulfide is added to an eluate storage. Heavy metals precipitate as sulfides, while aluminum remains in solution. In case the eluate consists of mainly iron sulfate or iron chloride the heavy metals are separated from the main part of the iron during elution and the eluate is split into two fractions. Heavy metals are then precipitated as sulfides from one eluate fraction. After removal of heavy metal precipitates by filtration/centrifugation in a filtration unit, the processed eluate can be used as a phosphorus precipitation reagent in sewage works and the heavy metals are disposed.

The entire strong acid cation exchange arrangement can be seen as a pre-treatment for providing a phosphate containing feed solution to a weak base anion exchange process.

The effluent from the strong acid cation exchange unit, which consists of a mixture of phosphoric and sulfuric acid, is thus according to the present invention entered into a weak base anion exchange arrangement as feed solution. The weak base anion exchange resin in the column is in the present embodiment in a free base form e.g. Purolite A 835 from Purolite or other equivalents, adsorbing phosphate and sulfate as mainly monovalent anions.

The effluent from the weak base anion exchange resin is deionized water and can be managed by reusing it in the process.

The weak base anion exchange resin is regenerated with ammonia, preferably aqueous ammonia, forming an eluate, which consist of a mixture of ammonium phosphate and ammonium sulfate. The composition of such eluate as obtained for the ash from Mora, Sweden is as follows: N:P:S 15:18:16 as % of dry weight.

The eluate is managed by a management arrangement. As described later in the present disclosure, phosphorus is precipitated as solid tri-ammonium phosphate and extracted from the solution. At least a part of the remaining eluate solution is provided through a recycling connection as regeneration solution for a subsequent regeneration.

The remaining dissolved sulfate after the separation of phosphate can be recovered by pressurizing ammonia into the solution. It is known that the solubility of ammonium sulfate decrease from 700 g $kg^{-1}$ in water to 115 g $kg^{-1}$ in concentrated aqueous ammonia (29 wt %). At 50 psi ammonia the solubility further decreases to 39 g $kg^{-1}$. After separation of ammonium sulfate crystals the remaining ammonia can be reused in the process.

The process control, in the method according to the invention, is simple, since the process is a deionization process and can be controlled by measuring conductivity. Mass balance calculations show that the required amount of chemicals per ton of ash, in the method according to the invention, is less then that required e.g. according to WO 00/50343. The costs of chemicals per ton of ash are also lower. Further, in the method according to the invention, there is a cost return for the ammonia used for regenerating the resin as it is a fertilizer ingredient and increase the value of the fertilizer product. The method according to the invention is a deionization process forming deionized water as an effluent. The water is also reused within the process.

Below, a process for recovering phosphorus from apatite minerals is described in details.

Apatite concentrate obtained by the beneficiation of mined phosphate rock is subjected to digestion with sulfuric acid according to known methods. Preferred process schemes include the hemi-hydrate re-crystallization process and the hemi-dihydrate process.

In the hemi-hydrate re-crystallization process, or hemi-dihydrate single stage filtration process, the first reactor operates under conditions in which gypsum precipitates as hemi-hydrate. The succeeding reactors operate under conditions favoring the re-hydration of hemi-hydrate gypsum to di-hydrate gypsum. After re-hydration, or re-crystallization, gypsum and acid are separated and the gypsum is thoroughly washed. Filtered phosphoric acid and gypsum wash water can be blended providing a dilute phosphoric acid feed to an ion exchange method described above.

Alternatively, the hemi-dihydrate process can be applied, and a concentrated phosphoric acid, which does not require concentration by water evaporation, can be directly produced. In this process, the reaction takes place under conditions in which the gypsum precipitates as the hemi-hydrate. The hemi-hydrate gypsum and the product acid are separated by filtration before re-crystallization to di-hydrate gypsum. The hemi-hydrate gypsum is thereafter re-crystallized to the di-hydrate form and is filtered and thoroughly washed. The solution from the filtration and washing of the di-hydrate gypsum is provided as a feed to the ion exchange method described above.

Hemi-hydrate processes release most of the fluoride originating from the apatite during the digestion and fluorine is trapped using existing methods.

The acid digestion and gypsum treatment described above can be seen as a pretreatment providing a dilute phosphoric acid feed e.g. to a liquid/liquid extraction process.

If a liquid/liquid extraction is applied using organic extractants, weak base ion exchangers such as tertiary amines e.g. Alamine 336 manufactured by Henkel can be used. A possible diluent is kerosene and a possible modifier is isodecanol. The concentrations of extractant, diluent and modifier are chosen according to the characteristics of the feed phosphoric acid and the extraction system. For high phosphoric acid concentrations up to 50 percent of the volume can be Alamine 336 and 25 percent of the volume isodecanol.

Concerning the dilute phosphoric acid, the acid is fed to a liquid/liquid extraction process characterized by the above described organic phase. Upon mixing the aqueous phosphoric acid with the organic phase, phosphoric acid is transferred from the aqueous into the organic phase.

Removal of phosphoric acid from the aqueous phase through the weak base ion exchange increases the pH and results in precipitation of metal impurities.

The aqueous and organic phases are thereafter separated.

The raffinate, which is depleted in phosphate, is further treated to remove metal precipitates. It can then be used for apatite dissolution or gypsum washing.

The organic phase which is loaded with phosphorus is optionally scrubbed to remove co-extracted impurities and is thereafter stripped with an ammonia containing solution.

The strip solution used to remove phosphate from the organic phase is preferably aqueous ammonia having a concentration of between 5 and 25 weight percent ammonia. The solution is preferably made by dissolving gaseous ammonia in water.

When the P loaded organic phase is mixed with the strip solution, phosphate is removed from the extractant and mainly mono ammonium dihydrogen phosphate is formed. The neutralization between ammonia and acid is an exothermic reaction which results in heat production. However, the use of dilute aqueous ammonia enables the transfer of phosphate from the organic phase to the aqueous phase at temperatures below boiling point of the solvent. In general, the pH of the resulting aqueous phase containing mainly mono ammonium phosphate should be controlled to be below 7. The N/P mol ratio, the organic/aqueous volume ratio, ammonia concentration, temperature, etc. can be controlled and optimized in order to obtain a concentrated aqueous phosphorus solution without formation of precipitates, which enable an easy, continuous operation of the stripping procedure.

During stripping, two phases are formed: a phosphorus depleted organic phase and a phosphate containing aqueous phase. The two phases are separated.

The stripped organic phase is continuously recycled in order to extract phosphoric acid from a feed solution.

The ammonium phosphate containing aqueous phase is further processed. During the following processing, ammonia, preferably in gaseous or aqueous form, is added to the aqueous solution whereby mainly tri-ammonium phosphate is formed. As the solubility of tri-ammonium phosphate decreases rapidly in an excess of ammonia, tri-ammonium phosphate crystals are precipitated. The precipitation of tri-ammonium phosphate is selective and pure phosphate salts are formed. The precipitate is separated from the solution by means of filtration, sedimentation, centrifugation, etc.

The remaining aqueous solution after removal of tri-ammonium phosphate has a high content of ammonia. If necessary, the solution is treated for removal of impurities. The treated solution is then recycled to strip more phosphate from the loaded organic phase.

Tri-ammonium phosphate precipitate can be easily converted into a high quality product with a minimum of processing. The compound can be stabilized by drying, stabilized by addition of an acid or decomposed in a hot solution and the released ammonia can be reused. Stable pure di-ammonium phosphate and/or mono-ammonium phosphate are thereby produced.

From the two examples above, it is clear that both solid and liquid ion exchange can be used according to the principles of the invention for a number of applications. The present invention is not limited to the examples outlined in this disclosure, but is applicable to many different systems containing phosphate ions. Similar processes with minor modifications can be used e.g. for extracting phosphorus from minerals, P containing mine tailings, iron ores, ashes from incinerated animal by products, P containing streams within sewage treatment works, industrial effluents, etc.

Figure 5:
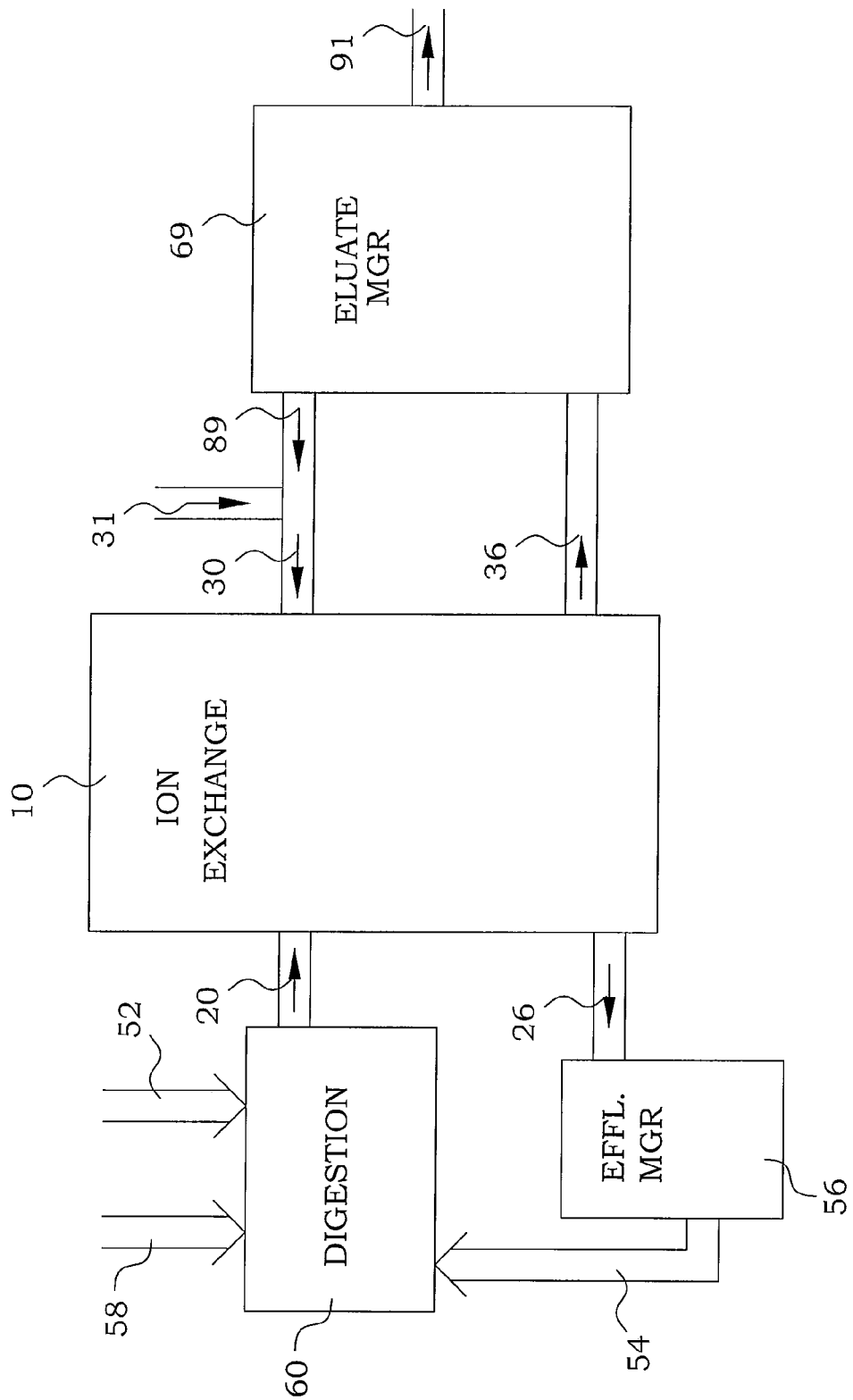
FIG. 5 is a schematic block diagram of an embodiment of a general ion exchange arrangement.

A general illustration is shown in FIG. 5. A raw material 52 is provided into a digestion unit 60. A dissolving liquid, e.g. an acid 58 is provided in order to provide a feed solution 20 to the ion exchange arrangement 10. This arrangement can make use of either solid or liquid ion exchange. The ion exchange arrangement 10 returns effluents 26, which typically are managed in an effluent manager 56, and parts 54 of the effluent, e.g. the water content can be reused in the digestion process again. The ion exchange arrangement 10 outputs an eluate 36 which is managed in a management arrangement 69. As described further below, tri-ammonium phosphate crystals are provided via an output means 91, whereas at least a part of the remaining eluate 89 is recycled and used as regeneration solution 30, together with additional fresh regeneration solution 31.

One important limitation of using prior art phosphorous ion exchange technology based on ion exchange is that the solution recovered during regeneration still has relatively low concentration far below the solubility product. Many approaches for increasing the concentration of general ion exchange eluates are available in prior art. The eluates from the weak base anion exchange scavengers may preferably be concentrated. Such ion concentration can be performed by any prior art technologies compatible with weak base anion exchange resins.

Using the principles described above, a solution of high concentration of phosphorous ion can be provided. In the present invention, the eluate from the ion exchange process is further processed. In this processing, ammonia is used as a pH regulator reagent. Ammonia is added in excess to eluate fractions consisting of ammonium phosphate containing solution.

It is known that the solubility of ammonium phosphate decreases with increasing ammonia concentration. The solubility decreases from 4.35 mol $l^{-1}$ as di-ammonium-hydrogen phosphate to 0.2 mol $l^{-1}$ as tri-ammonium phosphate at an increase of the concentration of ammonia to 4.5 mol $l^{-1}$ ($NH_3$+$NH_4OH$). The solubility of tri-ammonium phosphate further decreased to 0.05 mol $l^{-1}$ at an aqueous ammonia concentration of 10.5 mol N $l^{-1}$ ($NH_3$+$NH_4OH$). The decrease in the solubility of tri-ammonium phosphate enables to precipitate phosphorus at an efficiency of up to 99%.

The solubility of tri-ammonium phosphate thus decreases rapidly in an excess of ammonia and tri-ammonium phosphate crystals are formed. The precipitate can easily be separated from the liquid phase. Tri-ammonium phosphate can be easily converted into a high quality fertilizer with a minimum of processing. Tri-ammonium phosphate can be stabilized by addition of an acid e.g. sulfuric acid converting tri-ammonium phosphate into di-ammonium hydrogen phosphate and ammonium sulfate. Alternatively, tri-ammonium phosphate can be stabilized by drying and the released ammonia can be reused.

The precipitation of phosphorus as tri-ammonium phosphate is particularly useful in combination with earlier described ion exchange to extract phosphorus from process streams. Phosphorus is removed from the process solution using a weak base ion exchange scavenger followed by recovery of phosphorus as concentrated ammonium phosphate solution during regeneration with ammonia. Tri-ammonium phosphate is then precipitated from the eluate by further addition of ammonia.

According to the present invention, the ammonia remaining in solution after precipitation is reused for regenerating the scavenger. The application of precipitating tri-ammonium phosphate in an excess of ammonia to an eluate from the earlier described ion exchange process gives a very distinct synergetic advantage. The inherent property of the precipitation process of producing ammonium-containing liquors is turned into an advantage by recycling the ammonia back into the regeneration process of the scavenger.

Figure 6:
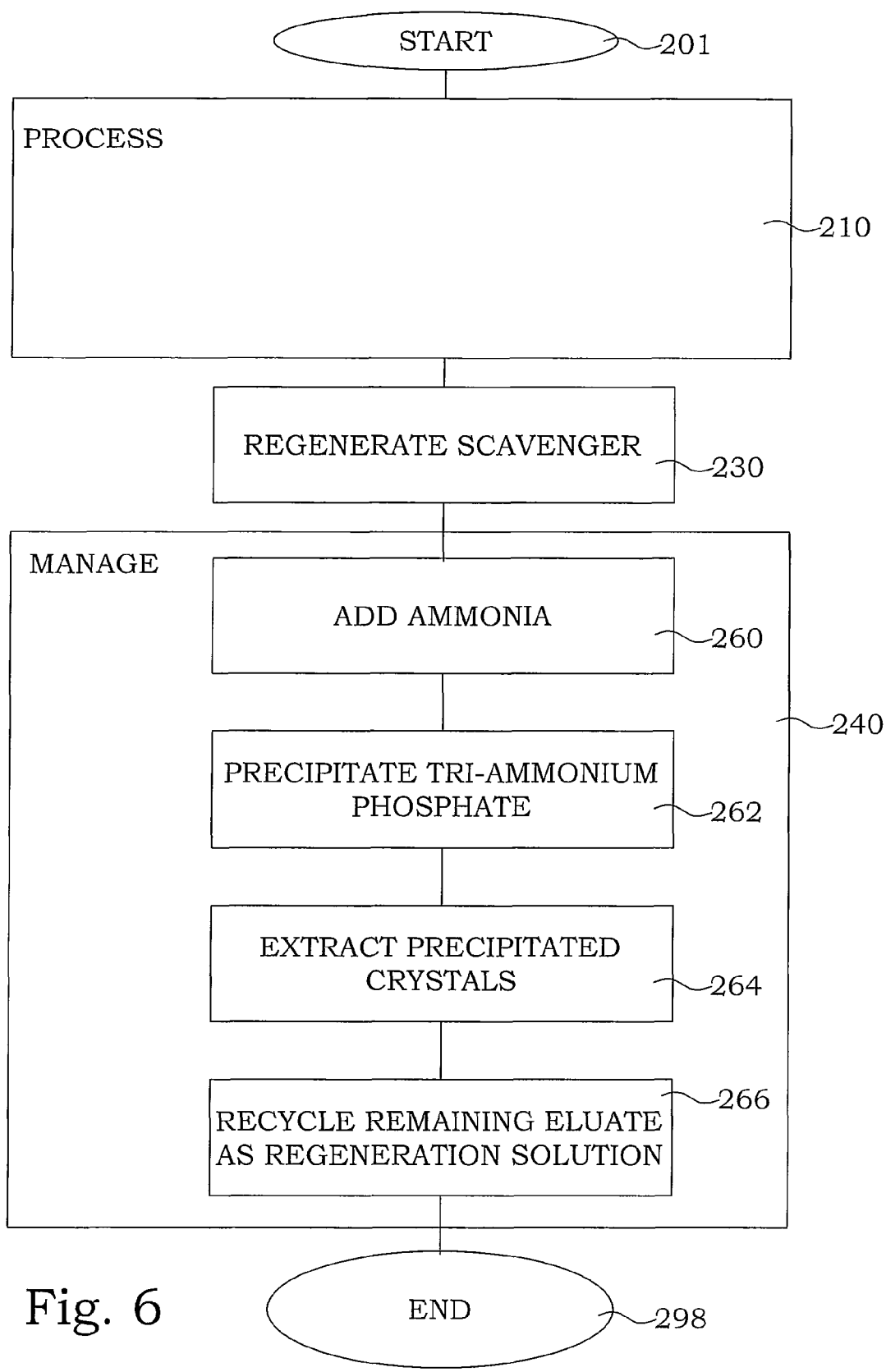
FIG. 6 is a flow diagram of main steps of an embodiment of a method according to the present invention.

As a conclusion, an increase of the ammonia concentration causes a drastic lowering of the solubility of tri-ammonium phosphate, whereby tri-ammonium phosphate can be precipitated and the remaining solution can be re-utilized as regeneration solution. In FIG. 6, main steps of an embodiment of a method according to this aspect of the present invention are illustrated. The method for ion exchange recovery of phosphorous starts in step 201. Step 210 is as described further above a processing step, where ions in a feed solution are exchanged to ions available at the scavenger. In step 230, the scavenger is regenerated by a regeneration solution having a basic pH. The phosphate ions are thereby eluated into an eluate by a charge neutralization reaction. In step 260, ammonia is added to the eluate, which comprises the phosphorous ions, to exceed a solubility concentration of tri-ammonium phosphate. In step 262, tri-ammonium phosphate crystals are precipitating, and in step 264 the precipitated tri-ammonium phosphate is extracted from the solution. Finally in step 266, at least a part of remaining eluate solution is recycled after precipitation as the regeneration solution for a subsequent regenerating step. The procedure ends in step 298.

From the previous disclosure, it is understood that a preferred embodiment is based on the extraordinary cooperation of the different part aspects of the present invention. The extraction of phosphorous by means of a weak base ion exchange resin, regenerated by solutions comprising ammonia, can easily be further improved by applying concentration procedures. Moreover, since ammonia already is used in the ion exchange procedure, the precipitation of the phosphate as tri-ammonium phosphate becomes very appropriate indeed, since the end product is a valuable fertilizer and the remaining solution can be re-entered into the ion exchange procedure or precipitation process again. The total concept will thus produce a valuable end product with very low need for managing rest products. Such a total concept then gains important synergetic effects.

Figure 7:
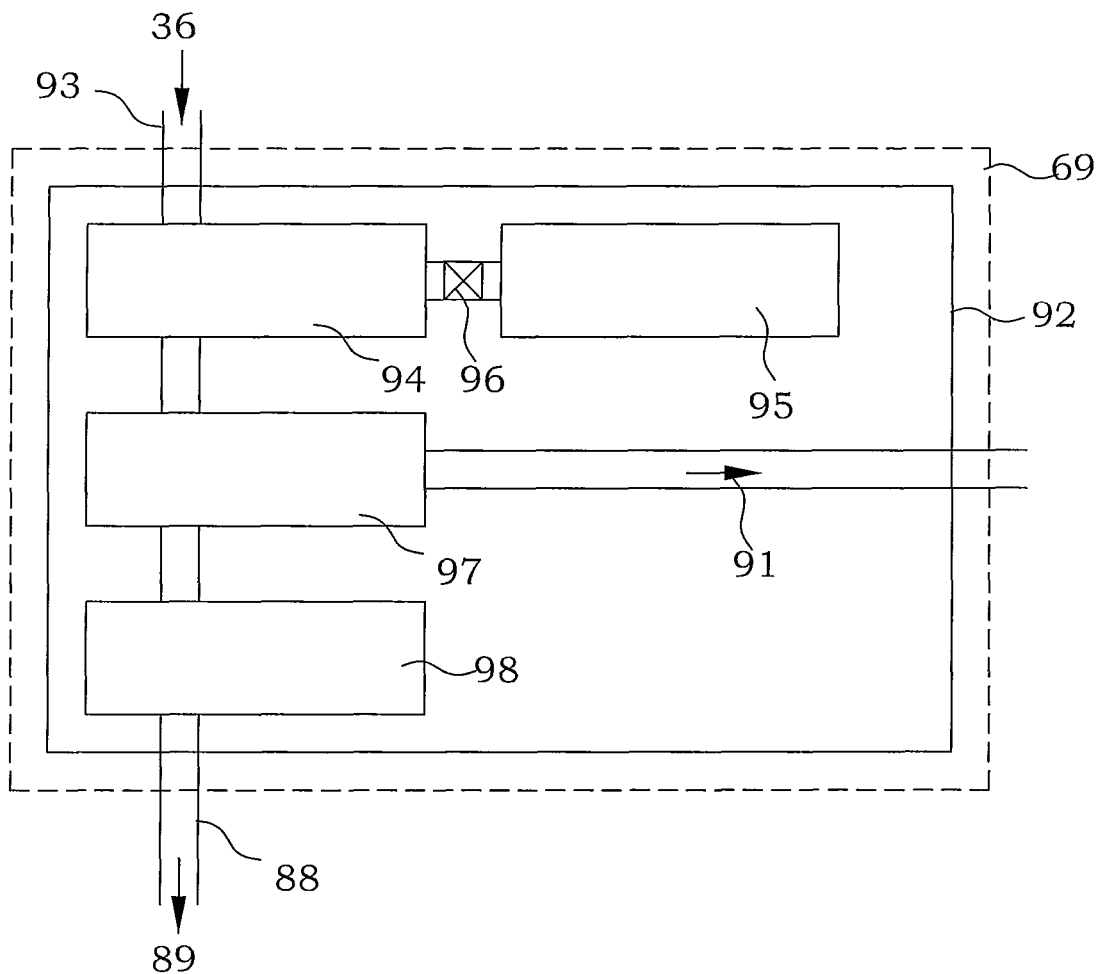
FIG. 7 is a schematic illustration of main parts of an embodiment of a precipitation arrangement used in an embodiment of the present invention.

In FIG. 7, an arrangement 92 for precipitation of phosphate ions in forms of phosphate containing substances from an eluate 36 is illustrated. The arrangement 92 is also arranged for extracting the precipitated substances. This arrangement 92 is by advantage the entire or a part of the managing means 69 of FIG. 5, as indicated by the broken box 69. The arrangement 92 comprises input means 93 for receiving the eluate 36 containing phosphate ions. The input means 93 is connected to a tank 94, where the eluate is collected. An ammonia supply 95 is connected to the tank 94 by a valve arrangement 96. The ammonia supply 95 and the valve arrangement 96 thereby constitute a means for adding ammonium ions to the solution in the tank 94. The amount of added ammonia exceeds a solubility concentration of tri-ammonium phosphate, whereby tri-ammonium phosphate crystals are formed in the solution. The solution is flown through a filter 97 removing the tri-ammonium phosphate crystals from the solution and provides solid tri-ammonium phosphate via an output means 91. Also other designs of adders arranged for adding ammonium ions and removers arranged to remove the tri-ammonium phosphate crystals from the solution are feasible. One alternative remover arrangement is to use a sediment chamber where the tri-ammonium phosphate is allowed to sediment, either only by gravity or enhanced by centrifugal forces. The remaining ammonia solution is stored in an ammonia storage 98 for further use according to the ideas presented above. To that end, at least a part of the remaining eluate solution 88 is provided as regeneration solution through a recycling arrangement 89 comprising a solution recycling connection.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

U.S. Pat. No. 2,850,358
U.S. Pat. No. 1,879,204
U.S. Pat. No. 1,835,441
GB 410,731
translation of the abstract to the Soviet patent 1450266
WO 00/50343
U.S. Pat. No. 3,579,322
GB 2,060,430
EP 0 399 803
GB 1,101,863
DE 1 442 500

The invention claimed is:

1. Method for recovery of phosphorous, comprising the steps of:
   providing a feed solution containing phosphate ions;
   exposing a scavenger having affinity for phosphate ions for said feed solution, whereby said phosphate ions are absorbed into said scavenger; and
   regenerating said scavenger by a regeneration solution having a basic pH, whereby said phosphate ions are eluated into an eluate formed from said regeneration solution;
   adding ammonium ions to said eluate to exceed a solubility concentration of tri-ammonium phosphate;
   precipitating tri-ammonium phosphate crystals from said eluate;
   extracting said tri-ammonium phosphate crystals from said eluate; and
   recycling at least a part of remaining eluate solution after precipitation as said regeneration solution for a subsequent regenerating step.

2. Method according to claim 1, wherein said scavenger is an ion exchange scavenger.

3. Method according to claim 2, wherein said ion exchange scavenger is a partially ionized weak base anion exchange scavenger, whereby said step of regenerating comprises a charge neutralization reaction.

4. Method according to claim 3, wherein said weak base anion exchange scavenger comprises at least one of primary, secondary and tertiary amines as a weak base functionality substance.

5. Method according to claim 2, wherein said ion exchange scavenger is a solid ion exchange resin.

6. Method according to claim 2, wherein said ion exchange scavenger is a liquid ion exchange extractant.

7. Method according to claim 3, wherein said ion exchange scavenger is a solid ion exchange resin.

8. Method according to claim 3, wherein said ion exchange scavenger is a liquid ion exchange extractant.

9. Method according to claim 4, wherein said ion exchange scavenger is a solid ion exchange resin.

10. Method according to claim 4, wherein said ion exchange scavenger is a liquid ion exchange extractant.

11. Arrangement for recovery of phosphorous, comprising:
input means for receiving a feed solution containing phosphate ions;
container containing a scavenger having affinity for phosphate ions, connected to said input means; and
regeneration arrangement providing a regeneration solution having a basic pH for regenerating said scavenger, having an output for a phosphate ion eluate formed from said regeneration solution;
an arrangement for precipitating phosphate containing substances from said eluate and extracting said precipitated substances;
said arrangement comprises means for addition of ammonium ions to exceed the solubility concentration of tri-ammonium phosphate, whereby of tri-ammonium phosphate crystals are formed; and
a recycling arrangement comprising a solution recycling connection to said regeneration arrangement and arranged for recycling remaining solution after precipitation as regeneration solution.

12. Arrangement according to claim 11, wherein said scavenger is an ion exchange scavenger.

13. Arrangement according to claim 12, wherein said ion exchange scavenger is a partially ionized weak base anion exchange scavenger, whereby said regeneration arrangement comprises means for performing a charge neutralization reaction.

14. Arrangement according to claim 13, wherein said weak base anion exchange scavenger comprises at least one of primary, secondary and tertiary amines as a weak base functionality substance.

15. Arrangement according to claim 12, wherein said ion exchange scavenger is a solid ion exchange resin.

16. Arrangement according to claim 12, wherein said ion exchange scavenger is a liquid ion exchange extractant.

17. Arrangement according to claim 16, wherein said liquid ion exchange extractant comprises at least one of primary, secondary and tertiary amines.

18. Arrangement according to claim 13, wherein said ion exchange scavenger is a solid ion exchange resin.

19. Arrangement according to claim 13, wherein said ion exchange scavenger is a liquid ion exchange extractant.

20. Arrangement according to claim 14, wherein said ion exchange scavenger is a liquid ion exchange extractant.

* * * * *

UNITED STATES PATENT AND TRADEMARK OFFICE
CERTIFICATE OF CORRECTION

PATENT NO.       : 8,518,359 B2                                                        Page 1 of 1
APPLICATION NO. : 12/531961
DATED            : August 27, 2013
INVENTOR(S)      : Yariv Cohen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 980 days.

Signed and Sealed this
Fifteenth Day of September, 2015

Michelle K. Lee
*Director of the United States Patent and Trademark Office*